H. AMENDT AND H. SCHERER.
OPERATING MECHANISM FOR TURNTABLES.
APPLICATION FILED DEC. 14, 1921.
1,410,442. Patented Mar. 21, 1922.
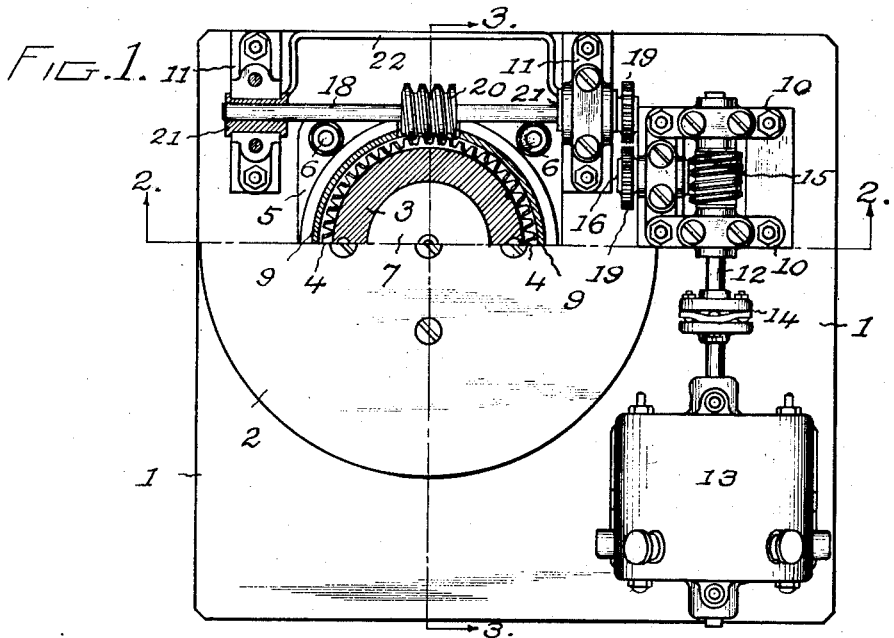
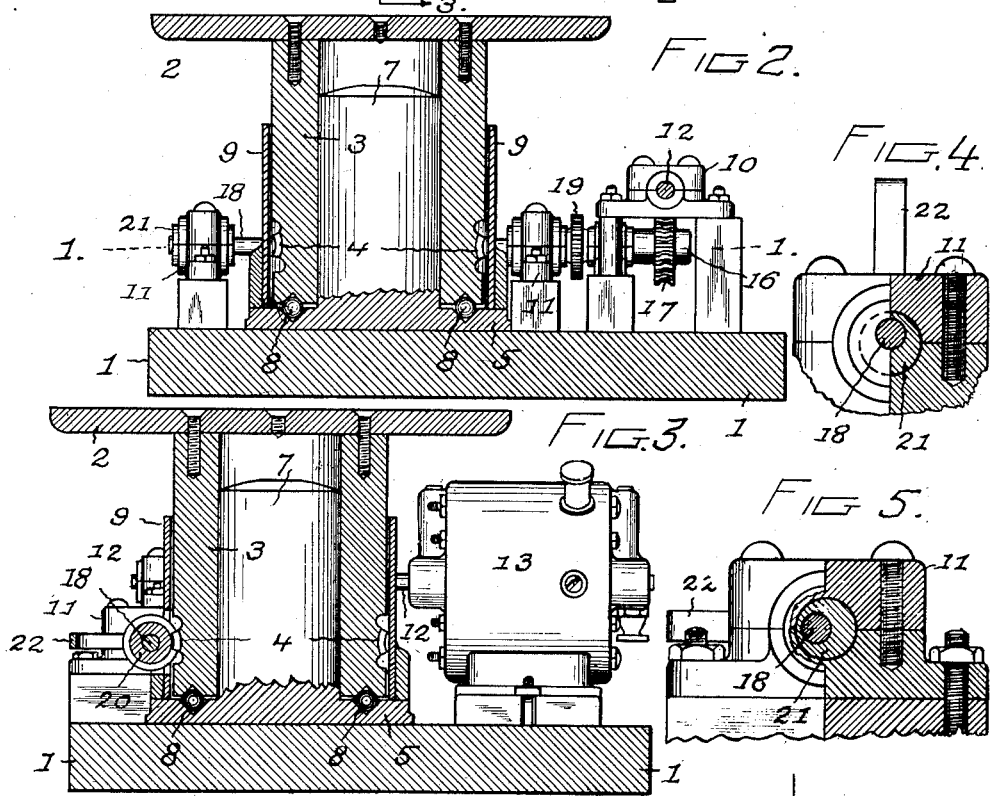
INVENTORS:
H. Amendt & H. Scherer.
by Robert Burns ATTORNEY.

UNITED STATES PATENT OFFICE.

HUBERT AMENDT AND HUBERT SCHERER, OF OTTAWA, ILLINOIS.

OPERATING MECHANISM FOR TURNTABLES.

1,410,442.  Specification of Letters Patent.  Patented Mar. 21, 1922.

Application filed December 14, 1921. Serial No. 522,317.

*To all whom it may concern:*

Be it known that we, HUBERT AMENDT and HUBERT SCHERER, citizens of the United States, residing at Ottawa, in the county of La Salle and State of Illinois, have invented a new and useful Improvement in Operating Mechanism for Turntables, of which the following is a specification.

This invention relates to power driven means for imparting rotation to turn tables and the like, and has for its various objects:—

To provide a structural formation and association of parts in a driving mechanism of the described type, whereby a small and high speed motor is adapted to effect a slow rotation of a turn table or platform in an effective and economical manner.

To provide means for moving the operating screw shaft out of engagement with the screw or worm teeth of the turn table when it is desired to revolve the same by hand, with a re-engagement of the parts as required, and in a simple and effective manner.

To provide a structural formation and combination of parts whereby a compact arrangement of parts is provided and the same effectively housed and lubricated, all as will hereinafter more fully appear.

In the accompanying drawings:—

Fig. 1, is a top view of the present turntable, with one half of the table or platform portion removed and with the trunnion portion thereof in horizontal section on line 1—1, Fig. 2.

Fig. 2, is a sectional elevation on line 2—2, Fig. 1.

Fig. 3, is a similar view on line 3—3, Fig. 1.

Figs. 4 and 5, are companion elevations partly in section of one of the journal boxes of the operating screw shaft, illustrating the two positions of the parts.

Like reference numerals indicate like parts in the different views.

Referring to the drawing, 1 designates a bed plate forming the support and connection for the parts and mechanisms of the present operating means 2 designates the turn table or platform of any usual and suitable formation, provided with a vertical journal sleeve 3 by which it is revolubly supported on a fixed trunnion hereinafter described.

4 designates gear teeth of the worm or screw type formed in the perimeter of the sleeve 3 aforesaid, near the lower end of the same, and adapted for operative engagement with a screw or worm shaft hereinafter described.

5 designates a base plate or footing fixedly secured to the bed plate 1 by bolts 6 and formed with an upright cylindrical portion or trunnion 7 adapted for bearing engagement with the bore of the journal sleeve 3 aforesaid.

8 designates a circular cluster of bearing balls arranged in aligned grooves or races in the respective lower end of the sleeve 3 and in the upper face of the base plate 5, adapted to receive the downward thrust or weight of the turn table and its load with a minimum degree of frictional resistance to a free rotation of the parts.

9 designates an annular sleeve surrounding the journal sleeve 3 and trunnion 7 aforesaid, and formed with a bottom flange by which it is secured in place by the bolts 6 which secure the base plate 5 in place.

10 and 11 designate pairs of pillow or journal boxes secured in right angle relation to each other upon the bed plate 1 and adapted to support shafts and parts as follows:

12 designates a primary shaft journalled in the pair of pillow blocks 10 in aligned relation to the armature shaft of an electric motor 13 mounted on the bed plate 1, with said shafts connected together by a flexible coupling 14. The shaft 12 carries a screw or worm hub 15 for driving engagement as follows:—

16 designates a counter shaft journalled in the pillow blocks 11 in right angle relation to the primary shaft 12 and carrying a screw or worm wheel 17 having operative engagement with the screw hub 15 aforesaid.

18 designates a secondary shaft also journalled in the pillow blocks 11 in parallel relation to the countershaft 16 and operatively connected thereto by a pair of spur gears 19. The shaft 18 has tangential relation to the screw or worm teeth 4 of the journal sleeve 3 aforesaid, and carries a screw or worm hub 20, passing through a side orifice in the enclosing shell or sleeve 9, and adapted for operative engagement with the screw or worm teeth 4 as shown in Figs. 1 and 3.

A material feature of the invention in connection with the parts just described, involves means for moving the shaft 18 and its worm hub 20 out of engagement with the screw or worm teeth 4 of the journal sleeve 3, when it is required to revolve the turn table by hand. In this:—

21 designates eccentric bearing bushings turning in the pillow blocks 11 and forming in turn the bearings of the shaft 18, as shown.

22 designates an operating handle or bail fixedly attached to the bushings 21 and adapted to simultaneously turn said bushings in effecting an operative engagement of the shaft 18 and journal sleeve 3 of the turn table, or a disengagement of said parts.

Having thus fully described our invention what we claim as new and desire to secure by Letters Patent, is:—

1. In an operating mechanism for turn tables, the combination of a bed plate, a turn table having a depending journal sleeve formed with peripheral screw teeth, a base plate secured to the bed plate and having a central trunnion engaging said journal sleeve and a shaft journalled in tangential relation to said journal sleeve and having a screw hub engaging the screw thread of said sleeve, an operating motor, a shaft connected thereto and arranged in right angle relation to the carrying shaft of the screw hub aforesaid, and operative connections between said shafts.

2. In an operating mechanism for turn tables, the combination of a bed plate, a turn table having a depending journal sleeve formed with peripheral screw teeth, a base plate secured to the bed plate and having a central trunnion engaging said journal sleeve, a shaft journalled in tangential relation to said journal sleeve and having a screw hub engaging the screw thread of said sleeve, an operating motor, a shaft connected thereto and arranged in right angle relation to the carrying shaft of the screw hub aforesaid, and worm and worm wheel connections between said shafts.

3. In an operating mechanism for turn tables, the combination of a bed plate, a turn table having a depending journal sleeve formed with peripheral screw teeth, a base plate secured to the bed plate and having a central trunnion engaging said journal sleeve, a shaft journalled in eccentric bushings operating means fixedly secured to said bushings, an operating motor, a shaft connected thereto and arranged in right angle relation to the carrying shaft of the screw hub aforesaid, a countershaft arranged in parallel relation to said screw hub carrying shaft and connected thereto by a pair of gear wheels, and a screw wheel and a screw hub connecting said countershaft with the shaft connected to the motor.

4. In an operating mechanism for turn tables, the combination of a bed plate, a turn table having depending journal sleeve formed with peripheral screw teeth, a base plate secured to the bed plate and having a central trunnion engaging said journal sleeve, a shaft journaled in eccentric bushings, an operating bail fixedly connected to said bushings, an operating motor, a shaft connected thereto and arranged in right angle relation to the carrying shaft of the screw hub aforesaid, a countershaft arranged in parallel relation to said screw hub carrying shaft and connected thereto by a pair of gear wheels, and a screw wheel and a screw hub connecting said countershaft with the shaft connected to the motor.

5. In an operating mechanism for turn tables, the combination of a bed plate, a turn table having a depending journal sleeve formed with peripheral screw teeth, a base plate secured to the bed plate and having a central trunnion engaging said journal sleeve, a cluster of balls arranged between the lower end of said sleeve and the upper face of the base plate, a circular shell enclosing the journal sleeve and associated parts, a shaft journalled in tangential relation to said journal sleeve and having a screw hub engaging the screw thread of said sleeve, an operating motor, a shaft connected thereto and arranged in right angle relation to the carrying shaft of the screw hub aforesaid, and operative connections between said shafts.

6. In an operating mechanism for turn tables, the combination of a bed plate, a turn table having a depending journal sleeve formed with peripheral screw teeth, a base plate secured to the bed plate and having a central trunnion engaging said journal sleeve, a cluster of balls arranged between the lower end of said sleeve and the upper face of the base plate, a circular shell enclosing the journal sleeve and its associated parts, a shaft journalled in eccentric bushings, operating means fixedly secured to said bushings, an operating motor, a shaft connected thereto and arranged in right angle relation to the carrying shaft of the screw hub aforesaid, a counter shaft arranged in parallel relation to said screw hub carrying shaft and connected thereto by a pair of gear wheels, and a screw wheel and screw hub connecting said countershaft with the shaft connected to the motor.

Signed at Ottawa, Illinois, this 10th day of December, 1921.

HUBERT AMENDT.
HUBERT SCHERER.